United States Patent [19]

Tanaka et al.

[11] Patent Number: 5,021,036

[45] Date of Patent: Jun. 4, 1991

[54] SEAMLESS SEMICONDUCTIVE BELT

[75] Inventors: Akihiro Tanaka; Tetsuhiro Ohsima, both of Moriyama; Takumi Sakamoto, Shiga, all of Japan

[73] Assignee: Gunze Ltd., Ayzbe, Japan

[21] Appl. No.: 573,754

[22] Filed: Aug. 28, 1990

[30] Foreign Application Priority Data

Sep. 1, 1989 [JP] Japan .................................. 1-227689

[51] Int. Cl.[5] .............................................. F16G 1/00

[52] U.S. Cl. .................................... 474/237; 474/266

[58] Field of Search ................ 474/237, 263, 266–268; 355/245, 246, 252, 3 BE; 101/93; 427/434.5, 434.6, 153, 152

[56] References Cited

U.S. PATENT DOCUMENTS

| | | | |
|---|---|---|---|
| 1,341,470 | 5/1920 | Kinnaird | 474/237 |
| 2,362,340 | 11/1944 | Bacon | 474/263 X |
| 4,772,253 | 9/1988 | Koizumi et al. | 474/266 |
| 4,863,419 | 9/1989 | Sansone | 474/237 |

*Primary Examiner*—Thuy M. Bui

*Attorney, Agent, or Firm*—Armstrong, Nikaido, Marmelstein, Kubovcik & Murray

[57] ABSTRACT

The invention provides a seamless semiconductive belt produced by cutting a seamless tubelike film made of a polycarbonate containing conductive carbon to desired length at right angles to the axial direction of the film, the film having a surface electrical resistance of about $10^5$ to about $10^{13}$ Ω/□ and the ratio of minimum surface electrical resistance to maximum surface electrical resistance being at least 0.01.

8 Claims, 1 Drawing Sheet

SEAMLESS SEMICONDUCTIVE BELT

FIELD OF THE INVENTION

The present invention relates to seamless semiconductive belts.

BACKGROUND OF THE INVENTION

Semiconductive belts made of plastics are being used for instruments and apparatus. Conventional semiconductive plastics belts have been produced by cutting a film to length and joining the ends of the cut film. Such belt, although endless, has a joint line which reduces the function of the film. For example, conventional plastics belts for use in a copying machine requiring the belt to precisely function adversely affect the image formation due to the joint, unavoidably leading to formation of deteriorated images. The joint of the belt is also responsible for dimensional variations and damage, rendering the belt less durable.

Semiconductive plastics belts used in other equipment are likewise impaired in the function by the joint. Therefore there is a great need for seamless belts.

SUMMARY OF THE INVENTION

An object of the invention is to provide a seamless semiconductive belt free from the above drawbacks of the prior art.

According to the present invention, there is provided a seamless semiconductive belt produced by cutting a seamless tubelike film made of a polycarbonate containing conductive carbon to desired length perpendicularly of the axial direction of the film, the film having a surface electrical resistance of about $10^5$ to about $10^{13}$ Ω/□ (ohms/square unit) and the ratio of minimum surface electrical resistance to maximum surface electrical resistance being at least 0.01.

DETAILED DESCRIPTION OF THE INVENTION

Figure 1:
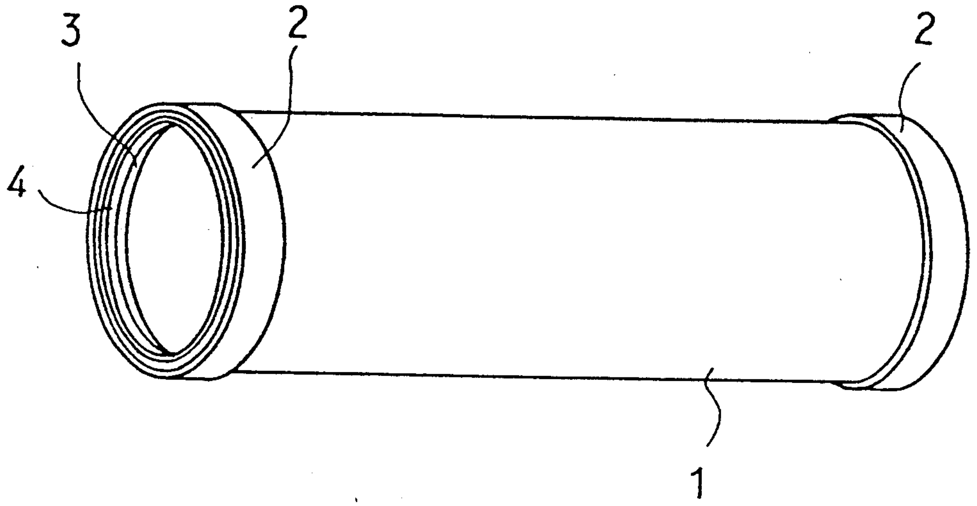

We carried out investigations to obtain seamless semiconductive plastics films. In the course of investigations, a seamless tubelike film was tentatively formed by extruding a polycarbonate containing conductive carbon. The film, however, tended to have a surface electrical resistance varied in a direction at right angles to the extrusion direction, i.e. in the circumferential direction of the tube. As a result, we found it difficult to obtain semiconductive belts having excellent properties. In the continued research, a tubelike film was formed by extrusion molding under such limited conditions that the resulting film had a surface electrical resistance of about $10^5$ to about $10^{13}$ Ω/□ and a ratio of minimum surface electrical resistance to maximum surface electrical resistance of at least 0.01. The tube was cut to length at right angles to the axial direction of the tube, whereby a seamless semiconducting belt was obtained. The obtained belt exhibited excellent electrical characteristics and was able, e.g. in a copying machine, to function well without forming defective images because of seamlessness. Further the film had an outstanding dimensional stability and a high durability. In brief, the belt was capable of obviating the prior art problems completely. The present invention has been accomplished based on these novel findings.

Polycarbonates for use in the invention are not specifically limited, and extrusion materials having a molecular weight of about 20,000 to about 50,000 are usually used as such. The shape of the material is not critical and may be granules, powders or the like.

The belt of the invention composed predominantly of a polycarbonate may contain another resin component which does not impair the function of the belt. Examples of useful resin components are polysulfone, polyether imide and the like.

An electrically conductive carbon is incorporated into the polycarbonate in the invention to impart semiconductivity thereto. Useful carbons are not specifically limited but usually include acetylene black, conductive furnace black and like carbon black materials, graphite, etc. The amount of the conductive carbon used is not critical and is suitably determined according to the intended electrical resistance. It is usually about 5 to about 20% by weight based on the total weight of the components used.

When required, the belt of the invention may further contain a suitable component in addition to the polycarbonate and conductive carbon. For example, a lubricant such as wax, silicone oil, polycarbonate oligomer or the like may be used to facilitate the mixing of polycarbonate and conductive carbon. The amount of the lubricant used is usually about 0.5 to about 1.5% by weight based on the total weight of the components used.

The semiconductive belt of the invention can be produced, for example, by the following method.

First the starting materials are mixed together by a method not specifically limitative, as by mixing. Mixers useful for the mixing are not specifically limited, but a twin-screw extruder or the like is desirable in view of the need to disperse the conductive carbon homogeneously. If required, the mixed materials are forced out usually from the extruder and cut into pellets. The mixed, optionally pelletized materials may foam before becoming absolute dry during the film formation, and thus may be preferably dehumidified or dried, if required, to a moisture content of not higher than about 0.03% by weight. When the materials are mixed and pelletized in the atmosphere of nitrogen gas, carbon dioxide gas or like gas with a low reactivity, or helium gas or like inactive gas, the molecular weight of polycarbonate is kept unvaried, hence presumably favorable. Care should be taken to avoid the change in the surface electrical resistance of obtained pellets due to the mixing.

Next the mixed, optionally pelletized materials are formed into a film in the shape of a tube. The term "film" used herein includes not only thin films but thick films such as sheets. The thickness of the film is in the range of about 20 to about 500 μm. The film-forming methods employable in the invention are not specifically limited, but an extrusion method using a ring die is preferred. An inside mandrel or outside mandrel is desirably used to give accurate dimensions, namely constant diameter and constant thickness, to the film being extruded from the ring die. Preferably the extruded tubelike film is withdrawn without creation of fold. For this purpose it is desirable to employ a pair of caterpillar-type conveyors having pressing means such as a soft pawl by which the film is lightly pressed during the withdrawal to avoid the formation of crease.

While variable depending mainly on the amount of conductive carbon used, the surface electrical resistance of the obtained film is widely varied according to the film-forming conditions. For this reason, the film-forming conditions should be carefully determined to control the surface electrical resistance as desired and to limit the variation of the resistance in any area to a specific range. In, e.g. film formation by extrusion, the surface electrical resistance may vary depending on the fluidity and viscosity of the mixed materials, pressure on the materials in the extruder and other factors. Consequently it is necessary in this case to determine accurately the shape of screw, amount of the extrudate, control of temperatures and the like.

The surface electrical resistance generally tends to vary widely in a direction at right angles to the extrusion direction (axial direction of the tube), namely in the circumferential direction of the tube. In view of this tendency, the temperature in the ring die during the extrusion is preferably finely regulated, as by stepwise control in the circumferential direction of the die. Stated more specifically, a film little varied in surface electrical resistance can be formed by controlling accurately the resin temperature in the die to a deviation of ±1° C., preferably ±0.5° C.

According to our research, the film-forming conditions adjusted to obtain a seamless semiconductive film having excellent electrical characteristics are such that the surface electrical resistance of the film is about $10^5$ to about $10^{13}$ Ω/□, preferably about $10^7$ to about $10^9$ Ω/□ and the ratio of minimum surface electrical resistance to maximum surface electrical resistance is at least 0.01, preferably at least 0.1.

The variation of film thickness affects the volume electrical resistance, tending to change the surface electrical resistance. Therefore care should be taken to control accurately the film thickness.

When a higher degree of dimensional accuracy is required, the accuracy can be attained by suitable methods, as by regulating the dimensions with a dimensionally controlling guide after extrusion or by stretching the film. The stretching of the film may vary the distribution of conductive carbon particles in contact with one another and may change the surface electrical resistance, depending on the percentage of stretch as determined longitudinally and/or laterally (axially and/or circumferentially) of the tube. Preferred percentage of stretch is up to 5% as determined longitudinally and/or laterally of the film. The stretching temperature is usually about 100° to about 180° C.

When the lubricity and like surface properties of the film are to be reduced due to the coagulation of conductive carbon, consideration may be taken of the filter in the extruder in which the polycarbonate remains molten. When required, a suitable lubricant such as silicone oil, tetrafluoroethylene polymer or the like may be incorporated into the film to improve the surface tension and other surface properties. The amount of the lubricant used is not specifically limited but usually in the range of about 0.1 to about 3.0% by weight based on the total weight of the components used.

When a tubelike film is produced under the above conditions, its surface electrical resistance and volume electrical resistance can be controlled to a reduced scattering of values, and the film retains the desired accurate surface property (i.e. surface smoothness) and attains a high degree of dimensional accuracy in the diameter, thickness and the like. If a film is produced without particular heed to electrical resistances, surface smoothness and dimensional accuracy, the mode of film formation is, of course, optional. It is generally desirable that belts have the above properties when intended for use as a functional element prone to affect the image formation (hereinafter referred to as "image-affecting element") in a copying machine or as a constituent member in memory means, electrostatic capacity controlling means, transit means or the like.

The obtained tubelike film is continuously cut to desired length in a direction (circumferential direction) at right angles to the axial direction (machine direction or extrusion direction) to obtain tubes of suitable width, namely the seamless semiconductive belts of the invention. The width of the belt can be conveniently altered by varying the length of the tube to be cut.

Figure 2:
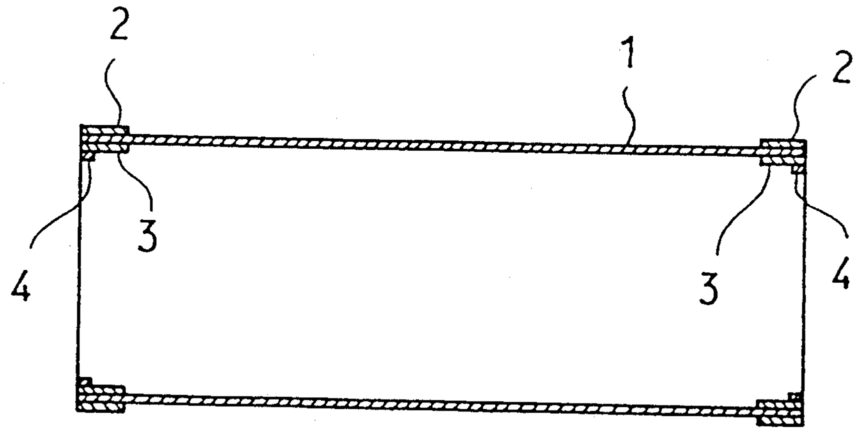

An example of the belt according to the invention for use, e.g. as an image-affecting element in a copying machine will be described below in greater detail with reference to the accompanying drawings in which FIGS. 1 and 2 show one embodiment of the belt according to the invention used as an image-affecting belt in a copying machine.

Generally image-affecting belts for holding and transporting a toner in a copying machine need to have a certain degree of surface electrical conductivity, usually a surface electrical resistance of about $10^5$ to about $10^{13}$ Ω/□. As shown in FIGS. 1 and 2, an image-affecting belt 1 can be improved in the durability, when so required, by adhering a tape of polyester or like tough material to the ends of the outer surface and inner surface with an adhesive to provide hemming members 2 and 3.

To prevent the zigzag movement of a conveyor belt, preventive members of suitable width (not shown) may be attached to the traverse ends of the belt, if necessary. The preventive members may be made of, for example, silicone rubber or the like. As shown in FIG. 2, a preventive member 4 may be adhered to the hemming member 3 of the belt 1. The position of the preventive member 4 is not specifically limited insofar as it is out of the way during the travel of the belt.

We discussed hereinbefore the belts of the invention, methods for production of the same and preferred modes of use all by way of example to which the invention, therefore, is not limited. Other various embodiments are possible without any deviation from the scope of the appended claims.

The seamless semiconductive belts of the invention have excellent electrical characteristics and are free due to the seamlessness from the damage caused by the joint and strong, hence durable. Further, the belts of the invention are highly heat-resistant and are expected to find wider applications. For example, the belt used as an image affecting element in a copying machine induces nc defective image or dimensional variation attributable to the joint, and consequently remarkable effects are obtained.

The present invention will be described below in greater detail with reference to the following Examples.

EXAMPLE 1

Polycarbonate (83% by weight) having a molecular weight of 30,000 and 17% by weight of acetylene black were mixed together by a mixer in the atmosphere of nitrogen gas. In the nitrogen atmosphere, the resulting mixture was kneaded, extruded in a twin-screw extruder and cut into pellets.

The obtained pellets were formed into a tubelike film 150 mm in outer diameter and 150 μm in thickness by a single-screw extruder having a ring die. The film was stretched 3% in the axial direction and in the circumferential direction respectively of the tube at a temperature of 150° C. During the film formation, the temperature in the die was controlled in the range of 250° C. ± 0.5° C. with a series of 4 heaters arranged for stepwise heating circumferentially of the ring die. A basket-shaped filter of stainless steel having fine pores of 20 μm diameter was used instead of a breaker plate. An inside mandrel was provided at the outlet of the extruder to regulate the inside diameter of the tube.

The obtained tubelike film was continuously cut to lengths of 350 mm at right angles (circumferentially) to the axial direction of the tube, giving the seamless semiconductive belts of the invention 154.5 mm in outer diameter, 350 mm in width and 136.5 μm in thickness.

EXAMPLE 2

A reinforcing tape of polyethylene terephthalate 75 μm in thickness and 20 mm in width was adhered to both sides of the ends of the belt obtained in Example 1. A preventive member of silicone rubber with a 500 μm thickness and 3 mm width was adhered to the tape to prevent the zigzag movement of conveyor belt as shown in FIG. 2. In this way, image-affecting belts for a copying machine were prepared.

The semiconductive belts prepared in Examples 1 and 2 were tested for properties. The tests were conducted by the following methods.

(1) Surface electrical resistance: According to JIS-K-6911

(2) Surface smoothness: According to JIS-B-0601

(3) Yield strength: According to JIS-K-6782

(4) Dimensional variation:

A dimensional variation was determined by dropping a load (1 kg/300 mm width) onto the tube.

(5) Repeatability of constant electrostatic capacity by electrostatic charge at constant voltage: According to JIS-L-1094, A method.

(6) Formation of image and durability:

The belt was mounted on a copying machine to evaluate the degree of the above.

Table 1 below shows the results.

TABLE 1

| | Example 1 | Example 2 |
|---|---|---|
| Surface electrical resistance (Ω/□) | $1.0 \times 10^8$ to $5.0 \times 10^8$ | $1.0 \times 10^8$ to $5.0 \times 10^8$ |
| Ratio of minimum surface electrical resistance to maximum surface electrical resistance | 0.2 | 0.2 |
| Surface smoothness (μm) | Less than 5 | Less than 5 |
| Yield strength (kg/cm$^2$) | 700 | 700 |
| Yield elongation (%) | 5 | 5 |
| Dimensional variation (%) | Less than 0.1 | Less than 0.1 |
| Repeatability of constant electrostatic capacity by electrostatic charge at constant volt | Good | Good |
| Formation of image | Flawless image formed | Flawless image formed |
| Durability | No change after 1000 revolutions | No change after 1000 revolutions |

We claim:

1. A seamless semiconductive belt produced by cutting a seamless tubelike film made of a polycarbonate containing conductive carbon to desired length at right angles to the axial direction of the film, the film having a surface electrical resistance of about $10^5$ to about $10^{13}$ Ω/□ and the ratio of minimum surface electrical resistance to maximum surface electrical resistance being at least 0.01.

2. A belt according to claim 1 wherein the conductive carbon is carbon black.

3. A belt according to claim 1 wherein the surface electrical resistance of the film is about $10^7$ to about $10^9$ Ω/□.

4. A belt according to any one of claims 1 or 3 wherein the ratio of minimum surface electrical resistance to maximum surface electrical resistance is at least 0.1.

5. A belt according to claim 1 wherein the tubelike film is stretched up to 5% in the axial direction and in the circumferential direction respectively of the film.

6. A belt according to claim 1 which is used as an image-affecting belt in a copying machine.

7. A belt according to claim 6 wherein hemming members are adhered to both ends of the inner surface and the outer surface of the tube.

8. A belt according to claim 7 wherein preventive members for preventing the zigzag movement of belt conveyor are provided on the tape adhered to the inner surface end.

* * * * *